United States Patent [19]

Smeltz

[11] Patent Number: 4,609,479
[45] Date of Patent: Sep. 2, 1986

[54] ORGANIC TITANIUM COMPOSITIONS AND THEIR USE AS CROSS-LINKERS

[75] Inventor: Kenneth C. Smeltz, Wilmington, Del.

[73] Assignee: E. I. Du Pont de Nemours and Company, Wilmington, Del.

[21] Appl. No.: 658,507

[22] Filed: Oct. 9, 1984

[51] Int. Cl.⁴ ............................................. E21B 43/26
[52] U.S. Cl. .............................. 252/8.551; 252/315.3; 536/121; 556/55
[58] Field of Search ...................... 252/8.55 R, 8.55 C, 252/315.3; 260/429.5; 556/55; 536/121

[56] References Cited

U.S. PATENT DOCUMENTS

| | | | |
|---|---|---|---|
| 2,870,181 | 1/1959 | Shacklett | 260/429.5 |
| 2,898,356 | 8/1959 | Russell | 260/429.5 |
| 3,888,312 | 6/1975 | Tiner et al. | 166/308 |
| 4,033,415 | 7/1977 | Holtmyer et al. | 166/308 |
| 4,462,917 | 7/1984 | Conway | 252/8.55 R |
| 4,464,270 | 8/1984 | Hollenbeak et al. | 252/8.55 R |

Primary Examiner—Herbert B. Guynn

[57] ABSTRACT

A process which comprises combining a polyol, water and an α-hydroxy carboxylic acid, and then reacting that combination of materials with a tetravalent titanium compound of an inorganic acid at an acid:titanium mol ratio between about 1:1 and about 3:1 and a polyol:titanium mol ratio between about 0.25:1 and about 2:1, the products formed thereby and their use in fluid-fracturing subterranean oil- and gas-containing formations.

45 Claims, No Drawings

ORGANIC TITANIUM COMPOSITIONS AND THEIR USE AS CROSS-LINKERS

SUMMARY OF THE INVENTION

The present invention relates to a novel process for preparing organic titanium compositions in which a tetravalent titanium compound of an inorganic acid is reacted with an aqueous solution containing an α-hydroxycarboxylic acid and a polyol. It relates also to the organic titanium compositions so formed. In addition, it relates to a process for hydraulically fracturing subterranean formations which involves the use of such organic titanium compositions as cross-linkers.

BACKGROUND OF THE INVENTION

Russell, in U.S. Pat. No. 2,898,356, disclosed that chelated titanium salts of α-hydroxy acids may be useful in the textile, leather and cosmetic industries, but that they may not be used at an alkaline pH. He proposed, therefore, a method for the preparation of a stabilized solution of such salts in alkaline aqueous media which comprises admixing a chelated titanium salt of an α-hydroxy acid with a polyol. He disclosed also that the chelated titanium salt of the α-hydroxy acid may be prepared by reacting an alkyl ester of ortho-titanic acid with an α-hydroxy acid or by reacting a titanium salt of an inorganic acid with an α-hydroxy acid. In the examples involving an inorganic titanium salt, Russell formed an aqueous solution of titanium tetrachloride or titanyl sulfate with sorbitol and then added malic or citric acid to it.

It has long been known that titanium esters react with high molecular weight hydroxyl-containing compounds so as to cross-link them and produce gels; J. Oil and Colour Chem. Assoc. 31, 405 (1948). However, the cross-linking reaction made through the use of simple alkyl esters of titanium proceeds too rapidly for most industrial uses. The cross-linking rate imparted by titanium esters can be depressed by combining a titanium ester with a variety of multi-functional compounds. For example, Shacklett, in U.S. Pat. No. 2,870,181, proposed a titanium compound prepared by reacting an orthotitanate with an α-hydroxy carboxylic acid in an organic solvent. It has also been proposed to combine a titanium ester with 2,4-pentanedione or with an acetoacetate; U.S. Pat. No. 2,680,108, The Organic Chemistry of Titanium by Feld et al., published by Butterworth (1965), and Yamamoto et al., JACS, 79 (1957), 4344–8. Alkanolamines, such as triethanolamine, have been used for that purpose as well; see U.S. Pat. Nos. 2,950,174 and 3,301,733.

For some time, it has been known also that the production of oil and gas can be stimulated by a technique, known as hydraulic fracturing, in which a fluid composition is introduced into an oil or gas well at a flow rate and pressure which create and/or extend a fracture into the oil- or gas-containing formation. The fluid composition usually carries a proppant (e.g., sand, bauxite, etc.) which is forced into the fracture by the fluid composition and prevents closure of the formation after the fluid pressure is released. For example, Crenshaw et al., in U.S. Pat. No. 3,634,237, disclosed fluid fracturing of oil and gas wells by the use of aqueous alcoholic solutions containing natural gums which had been thickened by the use of inorganic alkaline metal and alkaline earth metal salts. Likewise, Holtmyer et al., in U.S. Pat. No. 4,033,415, disclosed a fracturing fluid composed of a hydratable polysaccharide cross-linked in water by a cross-linking ion, e.g., Ti(IV) from $TiCl_4$. In U.S. Pat. No. 3,888,312, Tiner et al. disclosed hydraulic fracturing of subterranean formations using an aqueous gel prepared from a solvatable polysaccharide which had been cross-linked with ammonium tetralactotitanate(IV) or bis(triethanolamine)bis(isopropyl)-titanium.

While a variety of modified titanium ester compositions is available commercially, there is a need to provide titanium based cross-linkers which are less expensive to prepare. Thus, the accepted method for manufacturing some of the modified titanates described above involves starting with a titanium ester, such as tetraisopropyltitanate. Most commonly, such esters are prepared by reacting $TiCl_4$ with an appropriate alcohol in the presence of an amine and removing the by-product HCl as the amine salt. Thereafter the titanate is reacted with one of the modifying agents to give the titanium complex or chelate along with the by-product alcohol. It is common to use or sell the reaction product without removing the alcohol.

The process and the products of the present invention provide advantages over those of the prior art. The compositions of the present invention are more effective as cross-linkers than those of Russell. Moreover, the products of the present invention are prepared directly from the titanium salt, such as $TiCl_4$, thus eliminating the step of preparing the titanate. In addition, the process and products of the present invention involve an aqueous medium, thereby avoiding flammability and pollution problems associated with some of the prior art methods.

DETAILED DESCRIPTION OF THE INVENTION

The manufacturing process of the present invention comprises combining a polyol, water and an α-carboxylic acid, and then reacting that combination of materials with a tetravalent titanium compound of an inorganic acid. In a preferred embodiment, the so-formed composition is neutralized with a suitable base. The starting materials may be present at mol ratios in the range between about 1 to 3 mols of hydroxy acid per mol of titanium and between about 0.25 to 2 mol of polyol per mol of titanium. The process can be carried out at temperatures in the range from just above freezing to those in excess of 80° C. In one embodiment, temperatures above 35° C. are avoided as are those below about 15° C. In that embodiment, preferably the process is run at a temperature in the range between about 20° C. and 30° C. In another embodiment, the neutralized product is heated to a temperature between about 40° C. and about 80° C. for between about 1 hour and about 24 hours. Preferably, such post-heating is conducted at a temperature between about 60° C. and about 80° C. for about two hours to about four hours.

The α-hydroxy carboxylic acids useful according to the invention may be monocarboxylic acids, such as lactic acid and glycolic acid; dicarboxylic acids, such as malic acid; or tricarboxylic acids, such as citric acid. Moreover, they can be polyhydroxypolycarboxylic acids such as tartaric acid or saccharic acid, monocarboxylic acids having a plurality of hydroxy groups, such as gluconic acid and glyceric acid, or aromatic hydroxy acids such as mandelic acid. The polyols also vary widely. In general, they are trihydric, tetrahydric, pentahydric or hexahydric alcohols, including glycerol, erythritol, arabitol, xylitol, sorbitol, dulcitol, mannitol, and inositol. Other polyols useful in the invention include monosaccharides, e.g., glucose, fructose, mannose, galactose and xylose, as well as disaccharides, such as sucrose, lactose, maltose and cellobiose. Sorbitol is the preferred polyol for purposes of the invention.

In most cases in which neutralization is effected, a pH in the range between 6.5 and 9 is achieved. Preferably sufficient base is used so as to provide a pH between 7.0 and 8.5, particularly when the composition is to be used as a cross-linker in a process for hydraulically fracturing an oil- or gas-containing subterranean formation. Exemplary bases include sodium hydroxide, ammonium hydroxide and potassium hydroxide. Sodium hydroxide is preferred, particularly for a freeze-resistant composition having a water content in which the water:titanium mol ratio is between about 36:1 and about 60:1, most preferably between about 45:1 and 56:1.

In the hydraulic fracturing process of this invention, one or more fractures is created or extended in an oil- or gas-containing subterranean formation by introducing a cross-linked gel formed from a solvatable polysaccharide into the formation at a flow rate and pressure sufficient to create or extend such a fracture. The cross-linker consists essentially of one of the titanium compositions prepared in accordance with the method described above, preferably that prepared from TiCl$_4$, sorbitol, water and malic acid or lactic acid at a Ti:sorbitol:water:malic acid mol ratio of 1:1:50:1 or a Ti:sorbitol:water:lactic acid mol ratio of 1:0.5:46:1.

The solvatable polysaccharides include guar gum and locust bean gum, as well as other galactomannan and glucomannan gums, such as those derived from sennas, Brazilwood, Tera, Honey locust, Karaya gum and the like. Derivatives of such gums are useful also, e.g., hydroxyethylguar, hydroxypropylguar, carboxyethylhydroxyethylguar, carboxymethylhydroxypropylguar, and the like, as well as cellulose derivatives containing carboxyl groups, such as carboxymethylcellulose, carboxymethylhydroxyethylcellulose, and the like. Hydroxypropylguar and carboxymethylhydroxypropylguar are preferred polysaccharides for use in the present invention. Hydroxypropylguar is the most preferred gum based upon its commercial availability and desirable properties. On the other hand, carboxymethylhydroxypropylguar is sometimes used in place of hydroxypropylguar in fracturing fluids when the permeability of the formation is such that one wishes to keep the residual solids at a low level, so as to prevent formation damage. The solvatable polysaccharides can be used individually or in combination; usually, however, a single material is used. The solvatable polysaccharides are normally blended with a solvent such as water or an aqueous medium (e.g. aqueous methanol, ethanol, 1 to 3% HCl or potassium chloride) to form an uncross-linked gel as a first step.

The amounts of solvatable polysaccharide and the cross-linker therefor vary. One uses small but effective amounts which for both will vary with the circumstances, e.g. the type of geologic formation, the depth at which fluid fracturing is to be performed, temperature, pH, etc. Moreover, the type of cross-linker that is chosen will vary also with some of the same factors. In addition, their rates of cross-linking will be a factor to be considered in choosing the titanium compound. The aqueous titanium compounds of lactic and glycolic acids give approximately the same rate of cross-linking, with others in the following descending order: glycollic and lactic acids > malic acid > tartaric acid > citric acid > gluconic acid. In all cases, one uses as small an amount of each in water as will provide the viscosity level necessary to effect fracturing of the subterranean formation to the extent necessary to promote adequate recovery of oil or gas from it. For example, satisfactory gels can generally be made by using the solvatable polysaccharide in amounts up to about 1.5 weight percent and up to about 0.35 weight percent of the cross-linker, both percentages being based on the weight of the aqueous liquid. Preferably, from about 0.3 to about 0.7 weight percent of the solvatable polysaccharide is used and from about 0.075 to about 0.15 weight percent of the cross-linker.

The following Examples are given in further illustration of the invention but not by way of limitation. The Controls exemplify the type of composition which one would obtain by following the synthesis described by Russell in Example 13 of U.S. Pat. No. 2,898,356. Preparation of the compositions in the Examples and in the Controls were each carried out in a closed vessel containing an agitator, thermometer, condenser, nitrogen inlet and dropping funnel. Unless specified otherwise, percentages are given by weight. Temperatures are given in degrees Celsius. The crosslinking properties of the titanium compositions of this invention are given in the Examples as a function of the viscosity of hydroxypropylguar cross-linked with the titanium compositions. For a pH 7 gel, one blends for 30 minutes in a Waring Blender at a pH of 7: a fumaric acid/sodium bicarbonate buffer, 4.5 g of hydroxypropylguar and 0.9 g of sodium thiosulfate in 750 ml of 2% by weight KCl. If one wants a pH 8.6 gel, the fumaric acid is omitted. Unless specified otherwise, a pH 8.6 gel is used in the Examples. To any such gel in a 1500 ml beaker one adds 0.75 ml of cross-linker solution containing 0.00064 mol of titanium (hereinafter referred to as the Standard Loading Density) and mix vigorously for about 15–180 seconds. A 25 ml sample of that cross-linker containing gel is placed in the cup of the FANN 50 Viscometer with an R-1, B-3 configuration at 250° F. (121° C.) and 100 rpm (88 sec$^{-1}$) shear.

EXAMPLE 1

D,l-malic acid (40.2 g) and sorbitol (21.6 g) were dissolved in deionized water (108 g) and swept slowly with nitrogen. At 23°–25°, TiCl$_4$ (57 g) was added dropwise over a 70 minute period and stirring was continued at 23°–25° for an additional 30 minutes. Aqueous NaOH (226.2 g of a 30.3 % solution) was added dropwise at 25°–27° over a period of 82 minutes resulting in a pH of 7.0. The product was an aqueous solution which weighed 453 g and contained 3.18% of titanium. The cross-linking properties of a portion of it are given in Table I. Another portion of the product remained a clear liquid after 7 days at −25°.

CONTROL 1

Sorbitol (21.6 g) was dissolved in deionized water (300 g) and swept slowly with nitrogen. At 24°–25°, TiCl$_4$ (57 g) was added dropwise over a 52 minute period and stirring was continued at 23°–25° for an additional five minutes. D,l-malic acid (40.2 g) was added with stirring at 25° over a period of five minutes. Aqueous NaOH (230.4 g of a 30.3% solution) was added dropwise at 25°–28° over a period of 82 minutes resulting in a pH of 7.0. The product was an aqueous solution which weighed 649 g and contained 2.22% of titanium. The cross-linking properties of a portion of it are given in Table I. Another portion of the product was frozen solid after one day at −25°.

EXAMPLE 2

D,l-malic acid (40.2 g) and sorbitol (21.6 g) were dissolved in deionized water (108 g) and swept slowly with nitrogen. After cooling to about 4.5°, $TiCl_4$ (57 g) was added dropwise over a 65 minute period at 4°–8°. Stirring was continued for an additional 30 minutes while allowing the temperature to rise to about 21° over a period of 30 minutes. Aqueous NaOH (220.8 g of a 30.3% solution) was added dropwise at 25°–29° over a period of 2 hours and 28 minutes resulting in a pH of 6.8. The product was an aqueous solution which weighed 447 g and contained 3.23% of titanium. The cross-linking properties of a portion of it are given in Table I. Another portion of the product remained a clear liquid after five days at −25°.

CONTROL 2

Sorbitol (21.6 g) was dissolved in deionized water (300 g) and swept slowly with nitrogen. At 6°–8°, $TiCl_4$ (57 g) was added dropwise over a 63 minute period. Stirring was continued for an additional 13 minutes while permitting the temperature to rise to 25°. D,l-malic acid (40.2 g) was added with stirring at 25° over a period of 48 minutes. The reaction mixture was stirred for an additional seven minutes. Aqueous NaOH (223.4 g of a 30.8% solution) was added dropwise at 23°–28° over a period of 3 hours and 30 minutes resulting in a pH of 6.8. The product was an aqueous solution which weighed 641 g and contained 2.25% of titanium. The cross-linking properties of a portion of it are given in Table I. Another portion of the product was frozen solid after one day at −25°.

EXAMPLE 3

Sorbitol (27.3 g) and lactic acid (30.4 g of an 88.8% aqueous solution) were dissolved in deionized water (108 g) and swept slowly with of nitrogen. Titanium tetrachloride (57 g) was added dropwise over a 35 minute period at a pot temperature of 22°–26°. After 30 minutes of additional stirring at 25°, aqueous sodium hydroxide (191.9 g of a 30.3% solution) was added dropwise over a 1 hour and 46 minute period at 21°–26° to a pH of 7.2. The product was an aqueous solution which weighed 415 g and contained 3.47% of titanium. The cross-linking properties of a portion of it are given in the Table I, Example 3A. Another portion of the product was heated to 60° over a ten minute period and maintained at that temperature for two hours. It was cooled to about 25°, and aqueous sodium hydroxide (3.7 g of a 30.3% solution) was added to a pH of 7.2. The cross-linking properties of that second portion of the product are given in Table I, Example 3B.

EXAMPLE 4

Titanyl sulfate (120.6 g of $TiOSO_4 \cdot H_2SO_4 \cdot 8H_2O$) was added portionwise over a 75 minute period at 23°–26° to a stirred solution of sorbitol (27.3 g) and aqueous lactic acid (30.4 g of an 88.8% solution) in deionized water (108 g). The stirred, white mixture was swept with a slow stream of nitrogen. After stirring an additional 90 minutes at 25°, aqueous sodium hydroxide (200.4 g of a 31.2% solution) was added dropwise over a 2 hour and 10 minute period at 25°–27° to a pH of 7.2.

The product was an aqueous solution which weighted 487 g and contained 2.96% of titanium. The cross-linking properties of a portion of it are given in Table I.

TABLE I

| | Viscosity in Centipoises at t Minutes | | |
|---|---|---|---|
| | 30 | 60 | 90 |
| Example 1 | 420 | 390 | 354 |
| Control 1 | 390 | 306 | 258 |
| Example 2 | 378 | 348 | 282 |
| Control 2 | 330 | 306 | 282 |
| Example 3A | 438 | 432 | 396 |
| Example 3B | 558 | 480 | 438 |
| Example 4 | 426 | 372 | 342 |

EXAMPLE 5

D,l-malic acid (40.2 g) and sorbitol (54.6 g) were dissolved in deionized water (108 g) and swept slowly with nitrogen. At 20°–24°, $TiCl_4$ (57 g) was added dropwise over a 60 minute period and stirring was continued at 23°±2° for an additional 30 minutes. Aqueous NaOH (230.3 g of a 30.7% solution) was added dropwise at 23°–30° over a period of 2 hours and 3 minutes resulting in a pH of 6.8. The product was an aqueous solution which weighed 489.2 g and contained 2.94% titanium. The cross-linking and low temperature properties of a portion of it are given in Table II, Example 5A. Another portion of the product was heated to 60° over a ten minute period and maintained at that temperature for two hours. It was cooled to about 25°, and sodium hydroxide (3.7 g of a 30.3% solution) was added to a pH of 7.2. The cross-linking and low temperature properties of that second portion of the product are given in Table II, Example 5B.

EXAMPLE 6

D,l-malic acid (603 g) and sorbitol (409.5 g) were dissolved in deionized water (1620 g) and swept slowly with nitrogen. At 13°, addition of $TiCl_4$ was commenced, resulting in an exotherm to 25° after 15 minutes, addition of it being continued thereafter at 21°–25° over a 1 hour and 25 minute period. Stirring was continued at 23°–25° for an additional 30 minutes. The reaction mixture was cooled to 5°–10°. Aqueous NaOH (1637 g of a 30.3% solution) was added at 8°–9° over a period of 1 hour and 10 minutes. Addition of aqueous $NH_4OH$ (50% solution) was begun at 16° and continued at 25°–30° over a period of 1 hour and 40 minutes until 853 g thereof had been added and a pH of 7.5 had been reached. A sample of the product (80.3 g, 3.61% Ti) was heated to 50°±2° and maintained at that temperature for 24 hours. Upon cooling to 25°, it showed a pH of 6.8. The cross-linking and low temperature properties of the sample are given in Table II, Example 6A. Aqueous $NH_4OH$ (16.7 g of a 50% solution) was added to the remainder of the reaction product (5897.2 g) so as to provide a product weighing 5913.9 g containing 3.60 weight % Ti and having a pH of 7.5. The cross-linking and low temperature properties of the latter product are given in Table II, Example 6B.

EXAMPLE 7

Sorbitol (54.6 g) and d,l-malic acid (40.2 g) were dissolved in deionized water (108 g) and swept slowly with nitrogen. Titanium tetrachloride (57 g) was added dropwise over a 53 minute period at a pot temperature of 23°–25°. After 30 minutes of additional stirring at 25°, aqueous sodium hydroxide (99 g of a 30.3% solution)

was added dropwise over a 46 minute period at 24°–27°. Over a one hour period, aqueous ammonium hydroxide (60 g of a 50% solution) was added to a pH of 7.0. The cross-linking and low temperature properties of a portion of the product are given in Table II, Example 7A. Another portion of the product was heated to 60° over a 10 minute period and maintained at that temperature for 2 hours. Upon cooling to about 25°, it showed a pH of 6.4. Aqueous ammonium hydroxide (7.9 g) of a 50% solution) was added to a pH of 7.0. The cross-linking and low temperature properties of that second portion of the product are given in Table II, Example 7B. The two portions of the product had a total weight of 425.0 g and contained 3.37% titanium.

EXAMPLE 8

Aqueous dulcitol (18.8 g of a 97% solution) and d,l-malic acid (13.4 g) were dissolved in deionized water (36 g) and swept slowly with nitrogen. Titanium tetrachloride (19 g) was added dropwise over a 38 minute period at a pot temperature of 24°–27.5°. After 30 minutes of additional stirring at 25°, aqueous sodium hydroxide (75 g of a 30.3% solution) was added dropwise over a 2 hour and 18 minute period at 21°–28° to a pH of 6.8. The product was a slightly cloudy solution which after filtration gave a clear colorless solution which contained about 2.81% titanium (assuming 95% recovery after filtration). A portion of the filtered solution was held for one week at −25°, giving a mixture which was about 90% by volume liquid and about 10% by volume solid. Another portion of the filtered product was heated to 60° over a ten minute period and maintained at that temperature for two hours. It was cooled to about 25° and then showed a pH of 6.7. A portion of the heat-treated solution was held for one week at −25°, giving a mixture which was about 85% by volume liquid and about 15% by volume solid. The cross-linking properties of the heat-treated product are given in Table II, Example 8B.

EXAMPLE 9

The procedure of Example 5 was repeated, substituting anhydrous d-glucose (54.1 g) for sorbitol and using sufficient aqueous sodium hydroxide (240.3 g of a 29.5% solution) to provide a final pH of 8.1. The product was an aqueous solution which contained about 2.88% titanium. When viscosity measurements were attempted at the Standard Loading Density, the gel was too stiff to provide a true reading. Consequently, a portion of the product was tested at one-half the Standard Loading Density, giving the cross-linking properties set forth in Table II, Example 9A. Another portion of the product was heated to 60° over a ten minute period and maintained at that temperature for two hours. That portion of the product was cooled to about 25°, and aqueous sodium hydroxide (2.9 g of a 29.5% solution) was added so as to raise the pH to 8.0. When the latter portion of the product was tested at one-half the Standard Loading Density, the cross-linking properties given in Table II, Example 9B, were obtained.

EXAMPLE 10

The procedure of Example 9 was repeated substituting d-(+)-galactose for anhydrous d-glucose and using 244 g of a 29.5% aqueous solution of sodium hydroxide. The aqueous product contained about 2.86% titanium. The cross-linking properties of the product are given in Table II, Example 10A for that portion which was not heated to 60°, and Example 10B for that portion that was heated to 60°.

EXAMPLE 11

The procedure of Example 9 was repeated substituting myo-inositol for anhydrous d-glucose to give an aqueous product containing about 2.86% titanium. The cross-linking properties of the unheated product at one-half the Standard Loading Density are given in Table II, Example 11A. After heating a portion of the product to 60°, additional aqueous sodium hydroxide (4.4 g) was added to pH of 8.2. The Standard Loading Density cross-linking properties of a portion of the product which had been heated to 60° are given in Table II, Example 11B for a pH 7 gel. The cross-linking properties of a portion of that product at one-half the Standard Loading Density are given in Table II, Example 11C for a pH 8.6 gel.

EXAMPLE 12

The procedure of Example 11 was repeated using less myo-inositol (40.5 g) and less aqueous sodium hydroxide (241.3 g) to give an aqueous product containing about 2.96% titanium. The cross-linking properties of the product at one-half the Standard Loading Density are given in Table II, Example 12A. After heating a portion of the product at 60°, additional aqueous sodium hydroxide (2.7 g) was used to raise the pH to 8.0. The cross-linking properties of the heated product at one-half the Standard Loading Density are given in Table II, Example 12B.

EXAMPLE 13

The procedure of Example 11 was repeated using one-half as much myo-inositol (27 g) and slightly less aqueous sodium hydroxide (242.9 g) to give an aqueous product containing about 3.03% titanium. The cross-linking properties of the product at one-half the Standard Loading Density are given in Table II, Example 13A. After heating a portion of the product at 60°, a small amount of aqueous sodium hydroxide (2.1 g) was added to raise the pH to 8.0. The cross-linking properties of the latter portion of the product at one-half the Standard Loading Density are given in Table II, Example 13B.

EXAMPLE 14

Sorbitol (54.6 g) and lactic acid (30.7 g of an 88% aqueous solution) were dissolved in deionized water (108 g) and swept slowly with nitrogen. Titanium tetrachloride (57 g) was added dropwise over a 1 hour and 12 minute period at a pot temperature of 21°–25°. After 30 minutes of additional stirring at 25° to 30°, aqueous sodium hydroxide (197.6 g of a 30.3% solution) was added dropwise over a 3 hour and 55 minutes period at 21°–27° to a pH of 7.0. The reaction mixture was heated to 60° over a 20 minute period and maintained at that temperature for 2 hours. It was cooled to 25° and aqueous sodium hydroxide (7.9 g of a 30.3% solution) was added over 12 minutes to a pH of 7.0. The product was an aqueous solution which weighed 445.3 g and contained 3.22% of titanium. The cross-linking and low temperature properties of a portion of it are recorded in Table II.

EXAMPLE 15

Sorbitol (36.4 g) and lactic acid (30.4 g of an 88.8% aqueous solution) were dissolved in deionized water (108 g) and swept slowly with nitrogen. Titanium tetrachloride (57 g) was added dropwise over a 34 minute period at a pot temperature of 22°-25°. After 30 minutes of additional stirring at 25°, aqueous sodium hydroxide (189.8 g of a 30.3% solution) was added dropwise over a 2 hour and 53 minute period at 22°-25° to a pH of 7.2. The product was an aqueous solution which weighed 421.6 g and contained 3.42% of titanium. The cross-linking and low temperature properties of a portion of it are given in Table II, Example 15A. Another portion of the product was heated to 60° over a ten minute period and maintained at that temperature for two hours. It was cooled to about 25°, and aqueous sodium hydroxide (3.7 g of a 30.3% solution) was added to a pH of 7.2. The viscosity and low temperature characteristics of that second portion of the product are given in Table II, Example 15B.

EXAMPLE 16

Sorbitol (464.1 g) and lactic acid (516.9 g of an 88.8% aqueous solution) were dissolved in deionized water (1836 g) and swept slowly with nitrogen. Titanium tetrachloride (969 g) was added dropwise over a 1 hour and 44 minute period at a pot temperature of 23°-25.5°. After 49 minutes of additional stirring at 25°, aqueous sodium hydroxide (2954.5 g of a 33% solution) was added dropwise over a 2 hour and 12 minute period at 23°-27° to a pH of 7.2. The low temperature characteristic of a portion of the product is given in Table II, Example 16A. Another portion of the product was heated to 60° over a ten minute period and maintained at that temperature for two hours. It was cooled to about 25°, and aqueous sodium hydroxide (50.8 g of a 33% solution) was added to a pH of 7.2. The cross-linking and low temperature properties of that second portion of the product are given in Table II, Example 16B. The total weight of the product was 6769 g, and it contained 3.63% titanium.

EXAMPLE 17

The procedure of Example 16 was repeated using one-half as much sorbitol (232 g), slightly less water (1700 g) and slightly more aqueous sodium hydroxide (3016.7 g of a 33% solution). The low temperature characteristic of a portion of product is given in Table II, Example 17A. A second portion of the product was heated to 80° over a period of 40 minutes and maintained at 80°±2° for four hours. It was then cooled to 29° over a period of about five hours. The cross-linking and low temperature properties of the second portion of the product are given in Table II, Example 17B. The total weight of the product was 6420 g and it contained 3.80% titanium.

EXAMPLE 18

Citric acid monohydrate (63 g) and sorbitol (21.8 g) were dissolved in deionized water (108 g) and swept slowly with nitrogen. At 17°-244°, TiCl$_4$ (57 g) was added dropwise over a one hour period and stirring was continued at 21.5°-23° for an additional 10 minutes. Aqueous NaOH (267 g of a 30.7% solution) was added dropwise at 23°-28° over a period of 1 hour and 35 minutes resulting in a pH of 6.8. The product was an aqueous solution which weighed 515.7 g and contained 2.79% by weight of titanium. The cross-linking and low temperature characteristics of a portion of it are given in Table II, Example 18A. Another portion of the product was heated to 60° over a ten minute period and maintained at that temperature for two hours. It was cooled to about 25°, and aqueous sodium hydroxide (a few drops of a 30.7% solution) was added so as to raise the pH from 6.2 to 6.8. The cross-linking and low temperature characteristics of that second portion of the product are given in Table II, Example 18B.

EXAMPLE 19

The procedure of Example 18 was repeated with a larger amount of sorbitol (54.6 g) to provide an aqueous product which weight 547.8 g and contained 2.63% titanium. The cross-linking and low temperature characteristics of a portion of that product are given in Table II, Example 19A. After heating at 60°, additional aqueous sodium hydroxide (1.3 g) were added to bring the pH to 6.8. The cross-linking and low temperature properties of a portion of the heated product are given in Table II, Example 19B.

EXAMPLE 20

The procedure of Example 19 was repeated, substituting mannitol for sorbitol and neutralizing with 269.2 g of a 30.3% aqueous solution of sodium hydroxide to a pH of 7.0. The aqueous product contained about 2.61% titanium and exhibited the low temperature characteristic given in Table II, Example 20A. After heating a portion of the product at 60°, additional aqueous sodium hydroxide (1.4 g) was added to bring the pH to 6.95. The cross-linking and low temperature properties of the heated product are given in Table II, Example 20B.

EXAMPLE 21

The procedure of Example 8 was repeated with citric acid monohydrate (21 g) rather than d,l-malic acid and using sufficient aqueous sodium hydroxide (88.5 g) to provide a pH of 6.85. The aqueous product was filtered and contained about 2.396% titanium (assuming 90% recovery after filtration). After being held one week at −25°, the product consisted of about 83% by volume liquid and about 17% by volume solid. A portion that was heated at 60° for two hours exhibited the same low temperature properties as the foregoing. The cross-linking characteristics of the post-treated portion of the product are given in Table II, Example 21B.

EXAMPLE 22

The procedure of Example 19 was repeated, substituting aqueous glycolic acid (34 g of a 67% solution) for citric acid monohydrate, and using less water (97 g) and aqueous sodium hydroxide (202 g of a 30.3% solution) to a pH of 7.6. The aqueous product contained about 3.24% titanium and gave the cross-linking and low temperature properties set forth in Table II, Example 22A. A portion of the aqueous product was heated at 60°±2° for four hours after which additional aqueous sodium hydroxide (4 g) was added to bring the pH from 6.2 to 7.5. The cross-linking and low temperature properties of the latter portion of the product are set forth in Table II, Example 22B.

EXAMPLE 23

The procedure of Example 22 was repeated using half as much sorbitol (27.3 g). The product was neutralized with a mixture of aqueous sodium hydroxide (87.1 g of a 30.3% solution) and aqueous ammonium hydroxide (50.4 g of a 50% solution) following the same procedure as was used in Example 7. The neutralized product had a pH of 7.5 and contained about 4.08% titanium. After a week at −25°, the product was a liquid with a trace of haze. The cross-linking characteristics of the product are given in Table II, Example 23A. After 2 hours and 52 minutes at 60°, the aqueous product had a pH of 6.4 which was brought to 7.5 with a small amount of additonal aqueous ammonium hydroxide (1 g). The post-heated product exhibited the cross-linking and low temperature properties given in Table II, Example 23B.

EXAMPLE 24

Sorbitol (27.3 g) and aqueous gluconic acid (117.6 g of a 50% solution) were dissolved in deionized water (49.2 g) and swept slowly with nitrogen. Titanium tetrachloride (57 g) was added dropwise over a 46 minute period at a pot temperture of 21°-26°. After 30 minutes of additional stirring at 25°, aqueous sodium hydroxide (199.5 g of a 30.3% solution) was added dropwise over a 2 hour and 23 minute period at 22°-26° to a pH of 7.5 to give an aqueous product containing about 3.2% titanium. The cross-linking and low temperature characteristics of a portion of the product are given in Table II, Example 24A. Another portion of the product was heated to 50° over a 10 minute period and maintained at that temperature for 8 hours. After cooling to about 25°, the post-heated product was filtered to give an aqueous product containing about 3.16% Ti (assuming 99% recovery after filtration). The cross-linking and temperature characteristics of that second portion of the product are given in Table II, Example 24B. The two portions of the product had a total weight of 422.3 g.

TABLE II

| Example | 1 Week at −25° C. | Viscosity in Centipoises at t Minutes | | |
|---|---|---|---|---|
| | | 30 | 60 | 90 |
| 5A | Clear Liquid | 525 | 449 | 395 |
| 5B | Clear Liquid | 465 | 441 | 407 |
| 6A | Clear Liquid | 408 | 390 | 360 |
| 6B | Clear Liquid | 324 | 312 | 294 |
| 7A | Clear Liquid | 354 | 300 | Not run |
| 7B | Clear Liquid | 312 | 252 | 216 |
| 8A | 90% Liquid | | Not Run | |
| 8B | 85% Liquid | 456 | 432 | 384 |
| 9A* | Not Run | 588 | 384 | 294 |
| 9B* | Not Run | 444 | 282 | 222 |
| 10A* | Not Run | 588 | 396 | 300 |
| 10B* | Not Run | 402 | 288 | 222 |
| 11A* | Not Run | 528 | 396 | 312 |
| 11B | Not Run | 552 | 540 | 516 |
| 11C* | Not Run | 444 | 312 | 252 |
| 12A* | Not Run | 468 | 324 | 258 |
| 12B* | Not Run | 306 | 186 | 138 |
| 13A* | Not Run | 372 | 240 | 180 |
| 13B* | Not Run | 282 | 132 | 96 |
| 14 | Clear Liquid | 432 | 372 | 318 |
| 15A | Clear Liquid | 444 | 426 | 396 |
| 15B | Clear Liquid | 426 | 372 | 324 |
| 16A | Clear Liquid | | Not Run | |
| 16B | Clear Liquid | 450 | 396 | 324 |
| 17A | Clear Liquid | | Not Run | |
| 17B | Clear Liquid | 432 | 372 | 330 |
| 18A | Clear Liquid | 229 | 173 | 143 |
| 18B | Clear Liquid | 327 | 276 | 210 |
| 19A | Clear Liquid | 228 | 195 | 174 |
| 19B | Clear Liquid | 215 | 208 | 197 |
| 20A | Clear Liquid | | Not Run | |
| 20B | Clear Liquid | 246 | 222 | 192 |
| 21A | 83% Liquid | | Not Run | |
| 21B | 83% Liquid | 228 | 210 | 174 |
| 22A | Clear Liquid | 294 | 240 | 198 |
| 22B | Clear Liquid | 324 | 288 | 258 |
| 23A | Liquid - Slight Haze | 336 | 276 | 228 |
| 23B | Clear Liquid | 312 | 276 | 252 |
| 24A | Clear Liquid | 204 | 168 | 150 |
| 24B | Clear Liquid | 186 | 162 | 144 |

*Measured at one-half the Standard Loading Density

I claim:

1. A process which comprises combining a polyol selected from the group consisting of glycerol, erythritol, arabitol, xylitol, sorbitol, dulcitol, mannitol, inositol, monosaccharides, and disaccharides, water and an α-hydroxy carboxylic acid selected from the group consisting of lactic acid, glycolic acid, malic acid, citric acid, tartaric acid, saccharic acid, gluconic acid, glyceric acid and mandelic acid, and then reacting that combination of materials with a tetravalent titanium compound of an inorganic acid at an α-hydroxy carboxylic acid:titanium mol ratio between about 1:1 and aout 3:1 and a polyol:titanium mol ratio between about 0.25:1 and about 2:1.

2. The process of claim 1 wherein the water content is such as to provide a water:titanium mol ratio between about 36:1 and 60:1.

3. The process of claim 2 wherein said acid is lactic acid, glycolic acid, malic acid, citric acid, or tartaric acid.

4. The process of claim 2 wherein said polyol is glycerol, erythritol, arabitol, xylitol, sorbitol, dulcitol, mannitol, or myo-inositol.

5. The process of claim 2 wherein said polyol is sorbitol.

6. The process of claim 2 wherein said acid is lactic acid.

7. The process of claim 6 wherein said polyol is sorbitol.

8. The process of claim 7 wherein said titanium salt is TiCl$_4$.

9. The process of claim 8 wherein the mol ratio of lactic acid:sorbitol:titanium is 1:0.5:1.

10. The process of claim 9 wherein the water content is such as to provide a water:titanium mol ratio between about 45:1 and 47:1.

11. The process of claim 2 wherein said acid is malic acid.

12. The process of claim 11 wherein said polyol is sorbitol.

13. The process of claim 12 wherein said salt is TiCl$_4$.

14. The process of claim 13 wherein the malic acid:sorbitol:titanium mol ratio is 1:1:1.

15. The process of claim 13 wherein the water content is such as to provide a water:titanium mol ratio between about 49:1 and 51:1.

16. The composition produced in accordance with the process of claim 1.

17. The composition produced in accordance with the process of claim 2.

18. The composition produced in accordance with the process of claim 3.

19. The composition produced in accordance with the process of claim 4.

20. The composition produced in accordance with the process of claim 5.

21. The composition produced in accordance with the process of claim 6.

22. The composition produced in accordance with the process of claim 7.

23. The composition produced in accordance with the process of claim 8.

24. The composition produced in accordance with the process of claim 9.

25. The composition produced in accordance with the process of claim 10.

26. The composition produced in accordance with the process of claim 11.

27. The composition produced in accordance with the process of claim 12.

28. The composition produced in accordance with the process of claim 13.

29. The composition produced in accordance with the process of claim 14.

30. The composition produced in accordance with the process of claim 15.

31. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 16.

32. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 17.

33. In a hydraulic fracturing process wherein a cross-linked gel is introduced into a subterranean oil- or gas-containing formation at a flow rate and pressure sufficient to create or extend one or more fractures therein, the improvement comprising effecting cross-linking of the gel with the composition of claim 18.

34. In a hydraulic fracturing process wherein a cross-linked gel is introduced into a subterranean oil- or gas-containing formation at a flow rate and pressure sufficient to create or extend one or more fractures therein, the improvement comprising effecting cross-linking of the gel with the composition of claim 19.

35. In a hydraulic fracturing process wherein an aqueous crossed-linked polysaccharide gel is introduced into a subterranean oil- or gas-containing formation at a flow rate and pressure sufficient to create or extend one or more fractures therein, the improvement comprising effecting cross-linking of the gel with the composition of claim 20.

36. In a hydraulic fracturing process wherein an aqueous polysaccharide gel is introduced into a subterranean oil- or gas-containing formation at a flow rate and pressure sufficient to create or extend one or more fractures therein, the improvement comprising effecting cross-linking of the gel with the composition of claim 21.

37. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 22.

38. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 23.

39. In a hydraulic fracturing process wherein an aqueous cross-linked polysaccharide gel is introduced into a subterranéan oil- or gas-containing formation at a flow rate and pressure sufficient to create or extend one or more fractures therein, the improvement comprising effecting cross-linking of the gel with the composition of claim 24.

40. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 25.

41. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 26.

42. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 27.

43. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 28.

44. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 29.

45. In a hydraulic fracturing process wherein an aqueous cross-linked polysaccharide gel is introduced into a subterranean oil- or gas-containing formation at a flow rate and pressure sufficient to create or extend one or more fractures therein, the improvement comprising effecting cross-linking of the gel with the composition of claim 30.

* * * * *